Oct. 31, 1967     O. R. STARKEY     3,349,550
PLANT COMPRESSING APPARATUS FOR MECHANICAL PICKERS
Filed Nov. 8, 1966     4 Sheets-Sheet 1
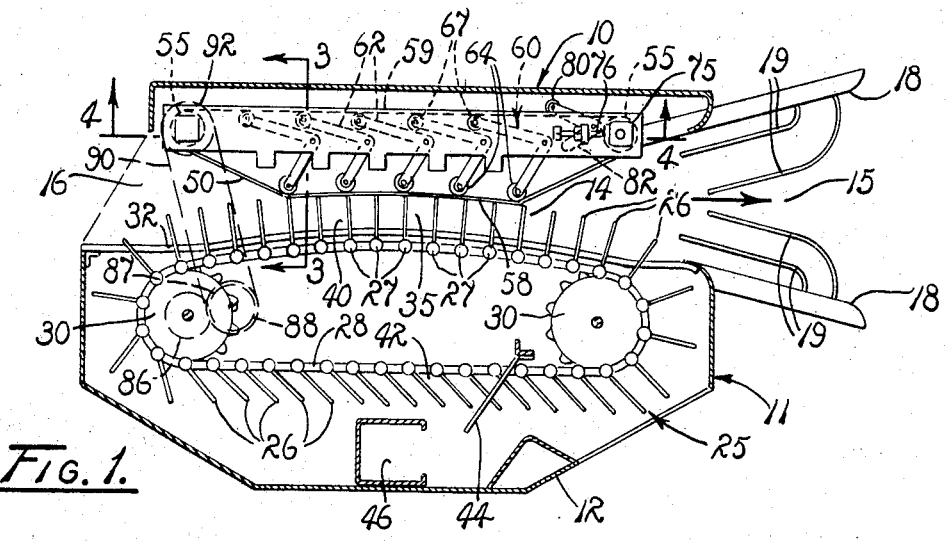
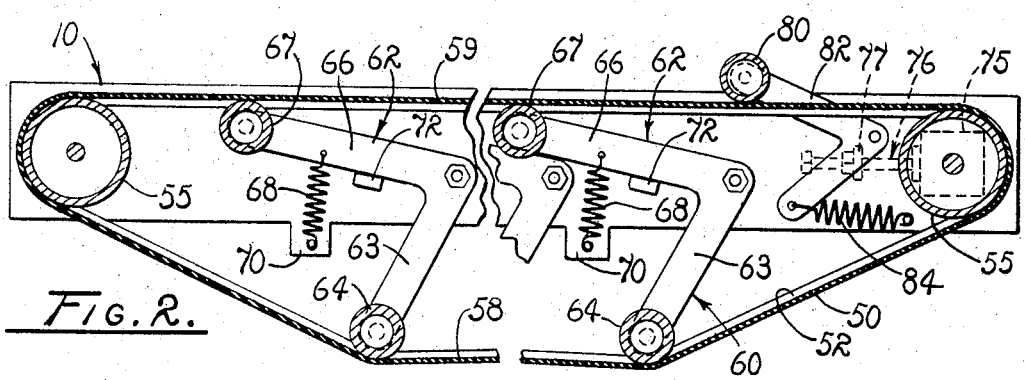
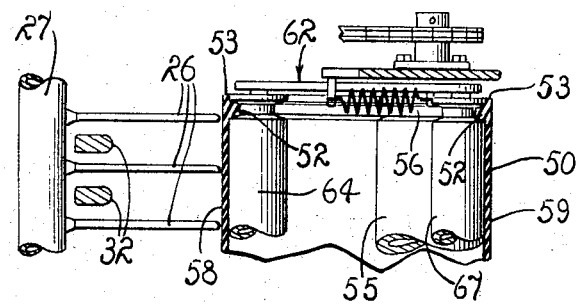
ORVAL R. STARKEY
INVENTOR
Huebner & Worrel
ATTORNEYS Oct. 31, 1967  O. R. STARKEY  3,349,550
PLANT COMPRESSING APPARATUS FOR MECHANICAL PICKERS
Filed Nov. 8, 1966  4 Sheets-Sheet 2
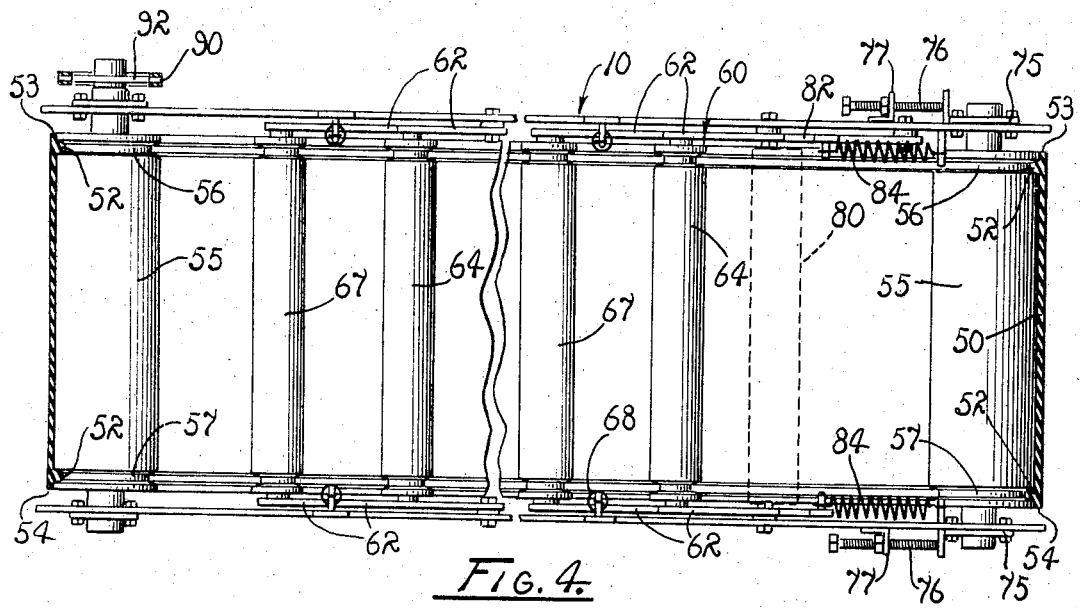
FIG. 4.
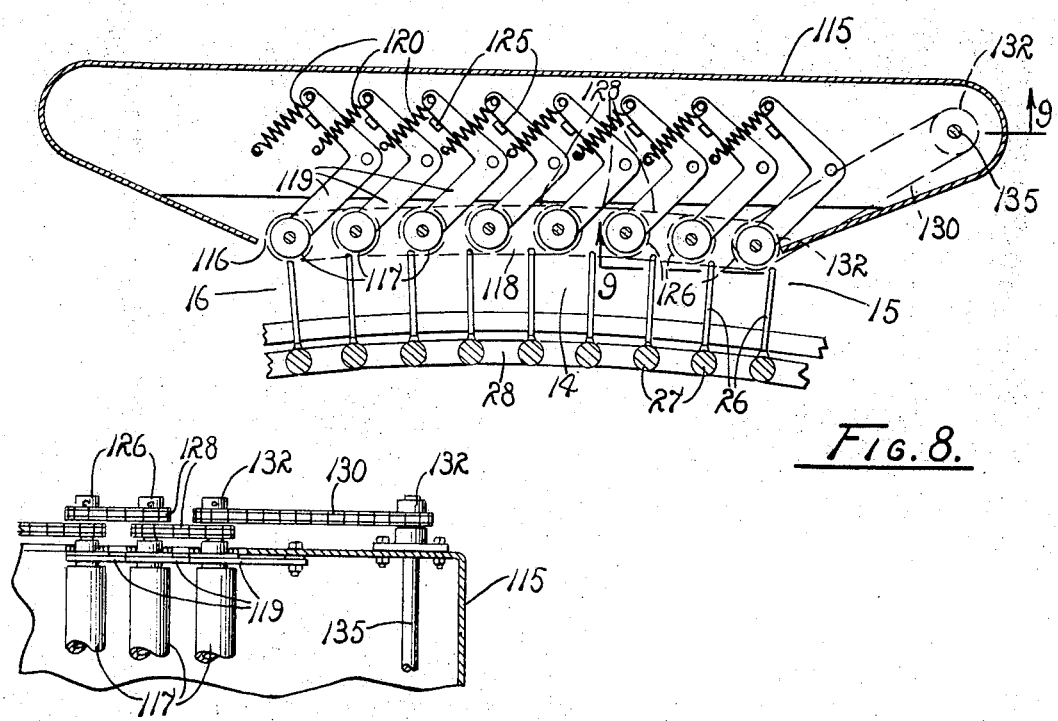
FIG. 8.
FIG. 9.
ORVAL R. STARKEY
INVENTOR
Huebner & Worrel
ATTORNEYS

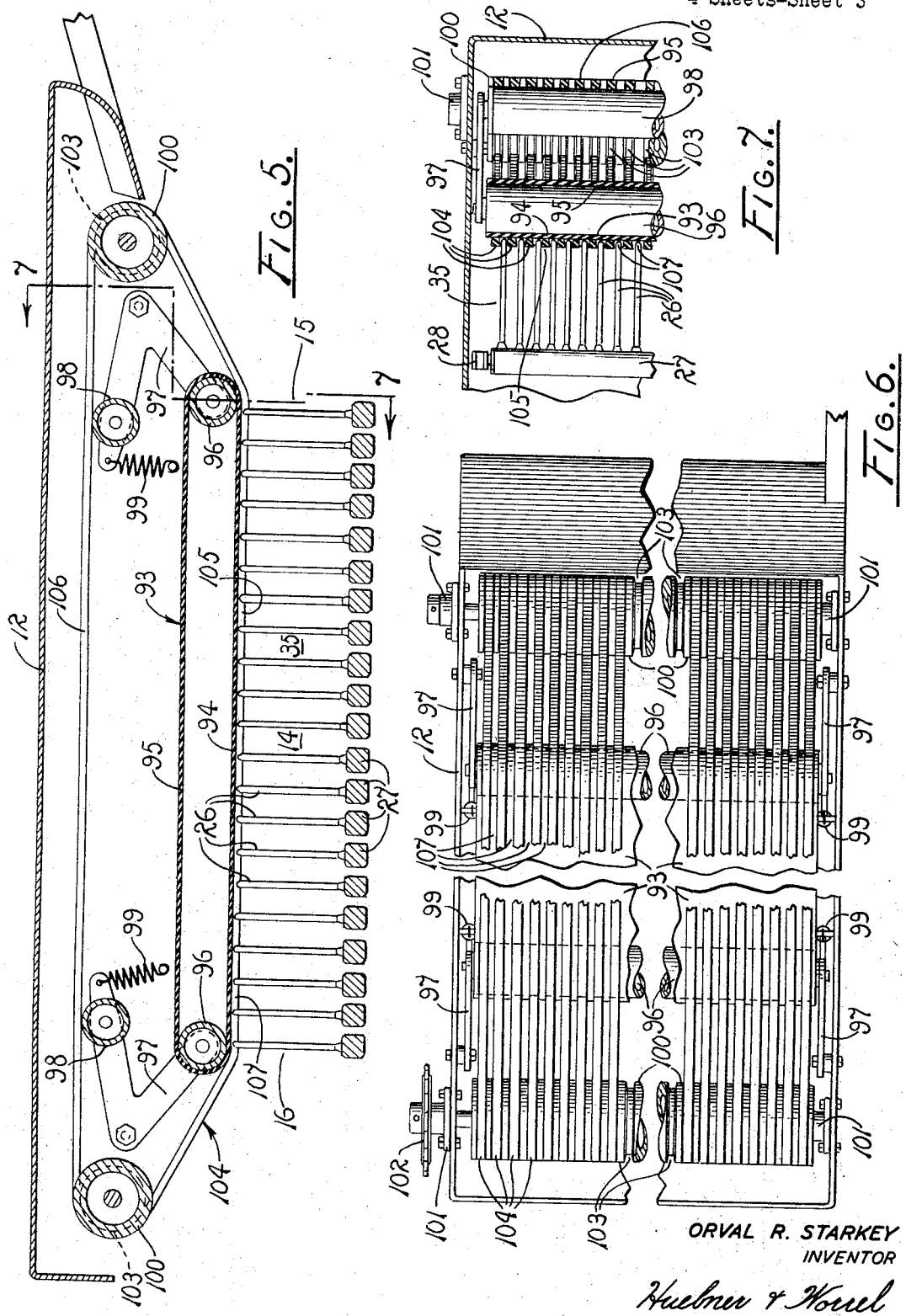

ORVAL R. STARKEY
INVENTOR

United States Patent Office 3,349,550
Patented Oct. 31, 1967

3,349,550
PLANT COMPRESSING APPARATUS FOR
MECHANICAL PICKERS
Orval R. Starkey, Fresno, Calif., assignor of fifty percent
to Anthony L. Lourenco, Fresno Calif.
Filed Nov. 8, 1966, Ser. No. 600,333
4 Claims. (Cl. 56—42)

ABSTRACT OF THE DISCLOSURE

A plant compressing apparatus for a mobile mechanical picker for cotton and the like having a plurality of power driven picking spindles traveled through a picking zone within the picker in a relative direction opposite to the direction of picker movement including a plant compressing member providing a movable surface in opposed relation to the spindles for travel with the spindles through the picking zone, said member being adapted to receive portions of the spindles during their movement through the picking zone.

---

This application is a continuation-in-part of application Ser. No. 397,985, entitled, "Plant Compressing Apparatus for Mechanical Pickers," filled Sept. 21, 1964 which is being abandoned without prejudice in favor of the present application.

Essentially, the present invention consists of an endless resiliently flexible member, such as a belt, mounted for circuitous movement about a pair of upright rotatable elements or cylinders journaled in the housing of a cotton picking unit. The belt has an inner plant compressing run disposed in coextensive tensioned juxtaposed relation to a plurality of rows of cotton picking spindles in the picking unit to provide a movable wall defining a side of a picking zone in opposition to a side defined by said spindles. As is well known, the spindles are actuated by a drive mechanism. The roller elements and belt are power driven from the spindle drive mechanism so as to travel the inner compressing run thereof in synchronized relation and in the same direction as the spindles so that as plants pass through the picking zone incident to forward ground traversing movement of the picking unit the belt remains relatively stationary with respect to the plants. The inner compressing run of the belt thereby constitutes a movable wall within the picking zone which continually urges the plants into optimum picking association with the picking spindles and substantially eliminates scuffing, staining, dropping or other damage to the picked cotton or disturbance of the immature cotton bolls not picked by the spindles.

Conventional cotton pickers normally employ substantially stationary plant compressing plates in laterally opposed spaced relation to a plurality of rows of barbed picking spindles which are traveled longitudinally of the rows of plants within the picking zone of the pickers. The compressing plates are usually resiliently mounted for lateral movement within the picking zone to urge the plants passing therethrough toward the spindles. As the plants progress through the picker, they slide against the compressing plate in position for the cotton bolls thereon to be engaged by the spindles. However, such conventional compressing plates impose considerable drag on the plants which tends to bend them forwardly with respect to the direction of picker movement, thus impairing picking efficiency. Furthermore, such relative sliding movement between the compressing plate and the plants has a tendency to break the more brittle plant stalks and leaves and to shove the remaining portions of the stalk against the sides of the barbed spindles which grind away minute fibers therefrom, causing intermixing of such extraneous material with the harvested cotton which is virtually impossible to remove by ginning. The spacing of the compressing plate from the spindles permits the plant stalks to be shoved past the ends of the spindles by the plate which greatly accelerates wear on the spindles, imposes considerable drag against spindle movement, requiring more power to move the picking unit through the field, and prevents straightening of the spindles within the picking zone which impairs penetration of the spindles into the cotton bolls. Furthermore, fields of cotton are normally picked several times in a season with the early picking encountering a large number of green or immature cotton bolls on the plants. Such immature bolls must be preserved on the plants so that they may ripen to full maturity for subsequent picking. During such picking, the relative sliding movement between the plants and the compressing plate causes a large number of such immature bolls to be knocked loose from the plants which results in a significant loss to the cotton grower. Presently, in order to reduce such losses, growers frequently resort to chemically treating the plants to cause premature defoliation for accelerating the opening of such immature bolls and to remove the leaves from picker interference. However, the defoliation process is not only costly but produces an inferior grade of cotton from the immature bolls, shortens the growing season and has an adverse effect on the tensile strength of the cotton fibers from even the mature bolls. Additionally, the bruising, rupturing, and tearing of the green bolls and other portions of the plants release plant sap and wax which accumulate on the spindles and other picking mechanisms to impair picking efficiency, require frequent cleaning, and reduce the quality of the picked cotton by staining.

Accordingly, it is an object of the present invention to provide an improved plant compressing apparatus for cotton pickers and the like.

Another object is to provide such an improved plant compressing apparatus which affords more efficient picking of mature cotton bolls with substantially less damage to the picked cotton than heretofore possible with conventional pickers.

Another object is to provide a plant compressing apparatus of the character described which minimizes the dropping and damage to unpicked, immature cotton bolls.

Another object is to provide such an improved plant compressing apparatus which minimizes damage to the branches and stalks of the plants so as to reduce the trash content of the harvested cotton.

Another object is to provide an improved plant compressing apparatus which virtually eliminates the need for present plant defoliation practices.

Another object is to provide a plant compressing apparatus which is capable of rectilinear movement with the spindles through the picking zone of the picker.

Another object is to provide a plant compressing apparatus which utilizes an endless movable compressing member capable of maintaining the desired lateral compression against the plants toward the spindles within the picking zone of the pickers.

Another object is to provide a plant compressing apparatus which is effective to reduce wear against the ends of the spindles for optimum penetration of the spindles into cotton bolls over longer periods than heretofore possible.

Another object is to provide a plant compressing apparatus which is driven in predetermined synchronized relation to the spindles of a cotton picker and with earth traversing movement so as to remain substantially stationary with respect to the plants in the picking zone.

Another object is to provide a plant compressing apparatus for cotton pickers of the type described which utilizes an endless belt having a plurality of spaced ribs defining channels therebetween for receiving the ends of the spindles to enhance penetration of the spindles into the cotton bolls and wrapping of cotton fibers onto the spindles.

Other objects and advantages of the present invention will become more fully apparent upon reference to the following description in the specification.

In the drawings:

FIG. 1 is a top plan view of a plant compressing apparatus embodying the principles of the present invention shown adapted to the picking unit of a cotton picker.

FIG. 2 is a somewhat enlarged top plan view of the plant compressing apparatus of FIG. 1 removed from the picking unit of the cotton picker.

FIG. 3 is a fragmentary somewhat enlarged transverse vertical section through the plant compressing apparatus of the present invention disposed adjacent to the picking spindles of the cotton picker, as taken on line 3—3 of FIG. 1.

FIG. 4 is a somewhat enlarged side elevation of the structure shown in FIGS. 1 through 3 with selected portions in section showing tensioning rollers for the plant compressing apparatus of the present invention.

FIG. 5 is a top plan view of a second form of the present invention utilizing a movable wall driven by a plurality of endless V-belts in frictional engagement therewith.

FIG. 6 is a side elevation of the wall and belt arrangement of FIG. 5 with portions broken away for illustrative convenience.

FIG. 7 is a fragmentary transverse vertical section through the compressing apparatus taken on line 7—7 of FIG. 5.

FIG. 8 is a top plan view of a third form of the plant compressing apparatus of the present invention.

FIG. 9 is a fragmentary transverse vertical section through the third form of FIG. 5.

Figure 10:
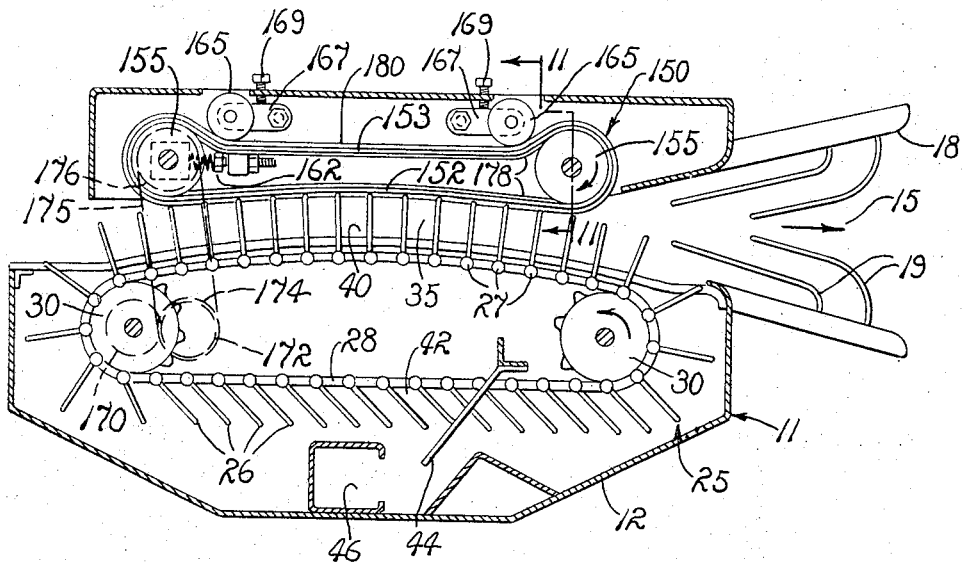
FIG. 10 is a top plan view of a fourth form of the plant compressing apparatus of the present invention similar to the second form but having a single integrally ribbed belt.

Referring more particularly to the drawings, a plant compressing apparatus embodying the principles of the present invention is generally indicated by the reference numeral 10 in FIGS. 1 through 4. As best shown in FIG. 1, the plant compressing apparatus is mounted within a picking unit 11 of a mobile cotton picking machine having a housing 12. The picking unit provides an elongated rectilinear plant passage 14 therethrough adapted to be aligned with rows of plants and having opposite inlet and outlet ends 15 and 16, respectively. A pair of forwardly outwardly divergently extended side plates 18 are mounted at the inlet end 15 of the passage which carries pairs of laterally opposed plant lifting fingers 19 which serve as initial guiding members to lift the lower portions of the cotton plants and to guide them through the picking unit in the well known manner.

The picking unit 11 is provided with a picking assembly 25 having a plurality of horizontally vertically spaced rows of picking spindles 26 mounted on substantially upright spindle bars 27. The bars are individually borne by endless chains 28 which are mounted for circuitous travel about a pair of spaced sprocket drums 30. A plurality of elongated grid bars 32 are mounted in longitudinally extended relation with respect to the passage 14 in the housing 12 in the intervals between the horizontal rows of spindles 26. The grid bars define one side of a picking zone 35 within the passage 14 of the housing of the picking unit 11.

The picking assemblies 25 further include a picking run 40 extended into the picking zone 35 and an opposite doffing run 42. A plurality of stripping bars 44 are angularly disposed with respect to the direction of travel of the spindles 26 adjacent to the doffing run 42 thereof to remove entwined cotton from the spindles. The doffed cotton is removed from the housing through a pneumatic conveyor pipe fragmentarily shown at 46. The sprocket drums 30 are power driven from a source on the picking machine, not shown, to drive the picking assemblies 25 in a counterclockwise direction, as shown in FIG. 1. As a result, the spindles 26 are driven within the picking zone 35 in a substantially rectilinear path from the inlet end 15 of the passage to the outlet 16 thereof. As is well known, the spindles are traveled rearwardly in the picker at substantially the same speed as the picker travels over the ground so as to remain stationary with respect to the plants during picking operations.

As best shown in FIGS. 2 and 3, the plant compressing apparatus 10 provides an endless resiliently flexible belt 50 which has a pair of endless V-shaped ribs 52 individually inwardly adjacent to its upper and lower side edges 53 and 54, respectively. The belt is mounted on a pair of spaced substantially parallel upright cylinders 55 journaled in the housing 12 of the picking unit 11. The cylinders provide upper and lower annular grooves 56 and 57, respectively, to receive the ribs 52 of the belt. The belt provides an inner compressing run 58 and an opposite outer run 59 between the cylinders.

The inner compressing run 58 of the belt 50 is disposed in coextensive relation adjacent to the rows of spindles 26 to provide a movable wall or reaction member defining an opposite side of the picking zone 35 spaced from the grid bars 32. The belt is disposed in such position by a plurality of belt tensioning assemblies 60. The belt tensioning assemblies provide a plurality of sets of bell crank levers 62 which are pivoted intermediate their ends in the housing individually adjacent to the upper and lower side edges 53 and 54 of the belt 50 for horizontal swinging movement between the inner and outer runs 58 and 59 of the belt. Each of the bell cranks includes an inner leg 63 which mounts an elongated roller 64 rollably engaging the inner periphery of the inner compressing run of the belt and an outer leg 66 mounting an elongated roller 67 rollably engaging the inner periphery of the outer run of the belt. A plurality of tension springs 68 are individually connected between brackets 70 on the housing and the outer leg 66 of each bell crank continually to position the inner rollers 64 against the inner compressing run of the belt to urge the belt toward the spindles 26 in the picking zone 35. Such position is determined by a plurality of stop members 72 rigidly secured to the housing in individual abutting relation to the outer leg 66 of each bell crank.

The belt 50 is initially tensioned about the cylinder 55 and the rollers 64 and 67 by an adjustable bearing block mounting 75 associated with the forwardmost cylinder 55. As shown in FIG. 2, an elongated screw threaded adjusting bolt 76 is connected to the block 75 and is screw threadably extended through a bracket 77 on the housing for rectilinear movement of the roller 55 against the belt. The tension of the belt is thereafter maintained by an auxiliary idler roller 80 which is constrained in rolling engagement with the outer periphery of the outer run 59 of the belt through a bell crank 82 and a tension spring 84 connected between the housing and the bell crank.

The plant compressing belt 50 is power driven for circuitous movement about the cylinders 55 and the rollers 64 and 67 in a clockwise direction, as viewed in FIG. 2, so as to travel the inner compressing run 58 thereof in the same direction as the picking run 40 of the picking assemblies 25. Such drive is provided by a spur gear 86 mounted coaxially on the rearwardmost sprocket drum 30 with the gear disposed in meshing engagement with a reversing spur gear 87. A sprocket 88 is mounted coaxially adjacent to the reversing gear 87 and is connected through an endless chain 90 to a sprocket 92 on the rearwardmost cylinder 55 of the compressing apparatus.

Second form

A second form of the plant compressing apparatus of the present invention for incorporation into the cotton picking unit 11 is shown in FIGS. 5, 6, and 7. The second form provides an elongated endless substantially flat plant compressing belt 93 of the same vertical width as the endless belt 50 of the first form but which may be somewhat shorter in length to correspond to the length of the picking zone 35 within the housing 12 of the picking unit 11. The belt includes an inner compressing run 94 disposed in contacting relation with the ends of the spindles 26 and an opposite outer run 95. The belt is trained for circuitous movement about a pair of freely rotatable, spaced substantially parallel upright rollers 96. The rollers are individually mounted at their upper and lower ends on bell cranks 97 pivotally mounted in the housing 12. The opposite ends of the bell cranks individually mount idler rollers 98 and have tension springs 99 connected thereto to urge the rollers 96 and the inner run of the belt continually toward the spindles.

A pair of cylinders 100 are individually rotatably mounted outwardly adjacent to each of the bell cranks 97 in the housing 12 by upper and lower bearing assemblies 101. The rearwardmost cylinder mounts a drive sprocket 102 comparable to the sprocket 92 of the first form which is driven by the chain 90 in correlation to the speed of travel of the spindles. Each of the cylinders includes a series of annular V-shaped grooves 103 in equally spaced relation throughout the length of the cylinders. The grooves receive a corresponding number of endless V-belts 104 in circumscribing relation to the compressing belt 93. The V-belts include inner runs 105 which frictionally engage the inner run 94 of the compressing belt 93 between horizontal, vertically spaced rows of spindles 26. The V-belts also include opposite outer runs 106 engaging the idler rollers 98 of the bell cranks 97. As best shown in FIG. 7, the inner runs of the V-belts provide elongated channels 107 therebetween into which are received the ends of the spindles for engagement against the inner run of the compressing belt. Such arrangement provides positive penetration of the spindles into the bolls of cotton on plants passing through the picking zone 35.

Third form

A third form of the plant compressing apparatus of the present invention is shown in FIGS. 8 and 9. The third form provides an elongated inner housing 115 having a lateral opening 116 adjacent to the picking zone 35 within the housing 12 of the picking unit 11. A plurality of equally spaced substantially upright parallel rollers 117 are disposed within the opening 116 so as to present a movable wall 118 adjacent to the ends of the picking spindles 26. The rollers are individually mounted on bell cranks 119 pivotally mounted intermediate their ends in the housing which are urged toward the spindles by a plurality of tension springs 120 individually connected between the housing and the opposite ends of each bell crank. A plurality of stop members 125 are secured to the housing in interfering individual abutting relation with the opposite ends of each bell crank to limit outward travel of the rollers farther into the picking zone. Each of the rollers mounts a pair of vertically spaced sprockets 126 thereon with adjacent sets of sprockets mounting endless chains 128 for successively driving the rollers 117 so that their peripheral portions disposed within the picking zone all move in a direction from right to left, as viewed in FIG. 8. The forwardmost roller sprocket 112 is driven through a drive chain 130 disposed about a drive sprocket 132 carried by a drive shaft journaled in the housing and connected to a power source on the picking unit 11, not shown.

Fourth form

Figure 11:
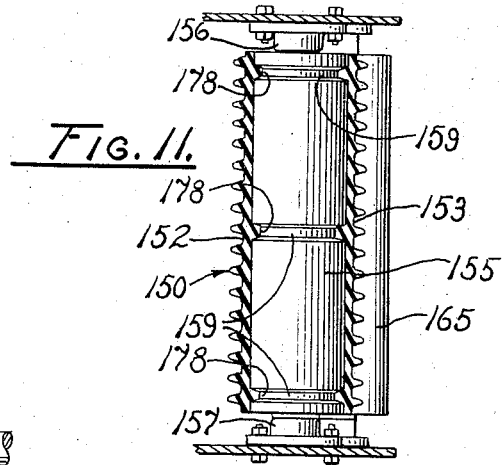
FIG. 11 is a somewhat enlarged fragmentary transverse vertical section through the belt of the fourth form and one of its mounting cylinders.
Figure 12:
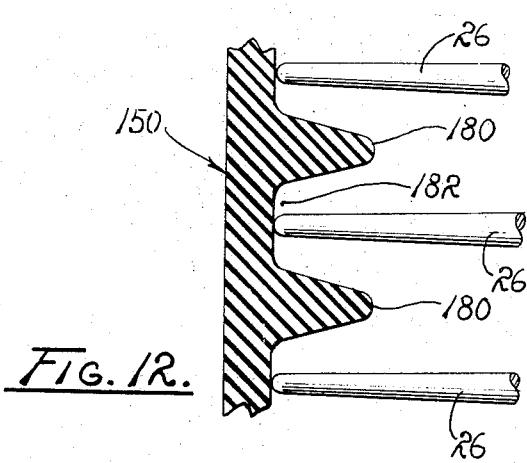
FIG. 12 is a further enlarged fragmentary transverse section through the belt with a plurality of picking spindles shown engaging the belt in operating position within the picking zone.

A fourth form of the plant compressing apparatus of the present invention is shown in FIGS. 10, 11 and 12. The fourth form provides an elongated endless resiliently flexible elastic plant compressing belt 150 having an inner compressing run 152 disposed in conforming engagement with the ends of the spindles 26 and an opposite outer run 153. The belt is trained for circuitous movement about a pair of rotatable, spaced substantially parallel upright cylinders 155. The cylinders are individually mounted at their upper and lower ends in bearing blocks 156 and 157, respectively, which are bolted to the upper and lower walls of the housing 12. Each of the cylinders has a plurality of longitudinally spaced annular belt positioning grooves 159. As best shown in FIG. 10, the rearwardmost cylinder has an adjustable mounting device 162 at its ends substantially identical to the roller mounting 75 of the first form of the invention for initially tensioning the belt around the cylinders. The tension on the belt is thereafter maintained by a pair of spaced idler rollers 165 rollably engaging the outer run 153 of the belt. The idler rollers are journaled at their ends in pivotally mounted bearing blocks 167. Adjusting bolts 169 are screw threadedly extended through the adjacent wall of the housing 12 for adjustably urging the rollers against the belt.

The plant compressing belt 150 is power driven, as in the previous forms, for circuitous movement about the cylinders 155 in a clockwise direction, as viewed in FIG. 10, so as to travel the inner compressing run 151 thereof in the same direction as the picking run 40 of the picking assemblies 25. Such drive is provided by a spur gear 170 mounted coaxially on the rearwardmost sprocket drum 30 with the gear disposed in meshing engagement with a reversing spur gear 172. A sprocket 174 is mounted coaxially adjacent to the reversing gear and is connected through an endless chain 175 to a sprocket 176 on the rearwardmost cylinder 155 of the compressing apparatus. The sprocket 176 has one less tooth than the sprocket 174 so that the belt is driven at a slightly higher velocity than the spindles 26.

The belt 150 is maintained in predetermined proper axial relation on the cylinders 155 by having a plurality of elongated integral ribs 178 formed on the inner surface thereof which are disposed in spaced axial relation for individual engagement in the grooves 159. A plurality of plant engaging ribs 180 are integrally formed on the outer surface of the belt in equally vertically spaced relation to define therebetween a plurality of elongated channels 182. The channels are aligned with spindles 26 and receive the ends of the spindles which engage the outer surface of the belt between the outer ribs. This arrangement is similar to the second form of the present invention but distinguishes therefrom in its utilization of the single integrally ribbed belt 150.

Operation

The operation of the described embodiments of the subject invention is believed to be clearly apparent and is briefly summarized at this point. The picking unit 11 being carried on a self-propelled vehicle, not shown, traverse a row of cotton plants aligned with the plant passage 14. During such travel, the plant lifting fingers 19 lift the lower branches of the individual plants and guide them toward the inlet end 15 of the plant passage. Progressive ground traversing movement of the picking unit causes the plants to be engaged by the picking spindles 26 and moved within the picking zone 35 in a substantially upright optimum picking attitude. The plants are then engaged by the compressing run 58 of the endless belt 50 which, like the spindles, is traveled at the same speed as the forward earth traversing movement of the picking unit so as to remain stationary with respect to the plants within the picking zone 35. During such movement, the plants are continually compressed against the spindles by the resilient mounting of the compressing run of the belt through the rollers 64, the bell cranks 62 and the tension springs 68. With such arrangement, the picking zone is able to accommodate relatively large size plant stalks without damaging such plants as they pass through the picking zone.

During such passage of the plant stalks through the picking zone 35 the bell cranks 62 individually pivot in a clockwise direction, as viewed in FIGS. 1 and 2. With such movement the outer legs 66 and rollers 67 move the outer run 59 of the belt laterally outwardly to maintain the desired tension on the inner run 58. The tensioning force on the belt is further augmented by the spring biased idler roller 80. Furthermore, since there is no relative scraping or dragging movement between the compression run of the belt and the plants, the immature cotton bolls on the plants can move virtually unrestricted through the picking zone with a minimum of disturbance. The compressing run 58 of the belt 50 thereby provides a movable wall within the picking zone which continually urges the plants in optimum picking attitude toward the picking spindles and substantially eliminates any dropping or damage of immature cotton bolls not picked by the spindles.

Operation of the second form

The operation of the second form of the present invention is substantially similar to the first form in that the compressing belt 93 presents a movable wall engageable with the ends of the spindles 26 within the picking zone 35. As described the V-belts 104 frictionally engage the surface of the inner compressing run 94 of the belt for rotation and rectilinear movement of the inner run at a speed corresponding to the speed of the spindles. During such movement of the picking unit, plants entering the picking zone are trapped between the spindles, the V-belts and the compressing belt and held in optimum upright position for engagement of the spindles with the cotton bolls of the plants. Such structure affords more positive penetration of the bolls by the ends of the spindles moving into the channels 107 between the V-belts. As in the first form, the compressing belt is permitted transverse outward movement to accommodate exceptionally large plant stalks by the resilient ounting of the bell cranks 97 which during such movement maintain tension on the belts 104 by engagement of the idler rollers 98 with their outer runs 106.

Operation of the third form

The operation of the third form of the present invention is substantially similar to the first and second forms in that the rollers 117 present individual peripheral surfaces disposed in tangential alignment to form the movable wall 118 within the picking zone of the picking unit 11. During earth traversing movement of the picking unit 11, plants enter the picking zone 35 and pass between the rollers 117 and the picking spindles 26. The movable wall 118 formed by the rollers constrains the plants in optimum picking attitude toward the spindles as in the preceding forms. Concurrently, the rollers are permitted lateral swinging movement so as to accommodate exceptionally large plant stalks therebetween without damage to the branches or to immature cotton bolls thereon.

Operation of the fourth form

The operation of the fourth form of the present invention is substantially similar to the second form in that the compressing belt 150 presents a movable wall with the channels 182 between the outer ribs 180 receiving the ends of the spindles 26 therein for optimum penetration into the cotton bolls of plants within the picking zone 35. Furthermore, the ribs 180 cooperate with the spindles positively to wrap and maintain the picked cotton fibers on the spindles during their movement through the picking zone. The fourth form further distinguishes from the second form in that the belt is driven at a slightly greater velocity relative to the spindles. Consequently, upon engagement of the ends of the spindles with the outer surface of the belt between the ribs, the outer ends of the spindles are urged ahead in their direction of travel to an optimum straightened picking position. Ordinarily in conventional cotton pickers when the spindles traverse the curvature of the forwardmost sprocket drum 30, their outer ends tend to lag somewhat as they approach the picking zone 35. This situation is now corrected by the faster traveling belt which physically straightens the spindles upon engagement to provide the optimum attitude for picking. Furthermore, since the ends of the spindles engage the belt, there is no lateral space therebetween for the plants to pass and rub against the spindles causing accelerated wear as occurs with the use of conventional stationary compression plates. It is further noted that the inner compression run 151 of the belt 150 is only flexed away from the spindles in the area of an obstruction, such as a green boll or large plant stalk, passing through the picking zone, with the remainder of the inner run maintaining full engagement with the ends of the spindles. This, of course, distinguishes the belt of the present invention over the conventional compression plates which are completely unilaterally moved farther away from the spindles during the passage of such obstructions through the picking zone.

In view of the foregoing, it is readily apparent that the structures of the four forms of the present invention have provided an improved plant compressing apparatus for cotton pickers which substantially eliminates any relative movement between the compressing wall and the plants which, in conventional structures, causes damage and loss of the immature cotton bolls thereon. All forms of the present invention effectively provide a movable wall in opposed relation to the picking spindles within the picking zone which travels at a speed correlated to the speed of the picking unit so as to remain relatively stationary with respect to the plants to preclude any scraping or relative sliding movement therebetween. Such device insures that only mature cotton bolls are picked and presents a minimum of disturbance to immature cotton bolls so as dependably to preserve their attachment to the plants for subsequent picking operations. Furthermore, the structure of the present invention can be adapted for use on relatively low powered picking machines inasmuch as it provides a picking zone which presents a minimum of restriction to the movement of plants therethrough.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A plant compressing apparatus, for a mechanical picker adapted for earth traversing movement along rows of plants having a housing providing an elongated passage therethrough defining a picking zone to receive such rows of plants and including a plurality of power driven picking spindles having extended ends traveled through the picking zone in a direction opposite to the direction of picker movement, comprising a plant compressing apparatus mounted within the housing and providing a movable surface adjacent to said picking zone in opposed relation to the spindles for travel with the spindles through the picking zone with said surface including a plurality of channels to receive the extended ends of the spindles during their travel through the picking zone.

2. The plant compressing apparatus of claim 1 in which said movable surface is provided by an elongated endless member having a plurality of integral longitudinally circumscribing ribs defining therebetween said spindle receiving channels with the ends of the spindles engaging said surface of the compressing apparatus between the ribs.

3. The plant compressing apparatus of claim 2 including means in the housing for driving the spindles through the passage at a velocity substantially equal to the earth traversing velocity of the picker; said endless member comprising a resiliently flexible plant compressing belt; a pair of spaced substantially parallel cylindrical rollers journaled in the housing and mounting the belt for circuitous movement within the housing; means connecting one of said cylinders with said means driving the spindles to motivate the belt at substantially the same linear velocity and in the same direction as the spindles, said belt having an outer run and an inner compressing run disposed adjacent to said picking zone of the passage in opposed relation to said picking run of the spindles with the ribs and channels on the belt being extended coextensively with the picking zone within the passage in parallel relation to the paths of movement of the spindles; and a pair of belt tensioning rollers adjustably mounted within the housing in rolling engagement with the outer run of the belt to tension said inner run of the belt against the ends of the spindles, said belt being constructed of a sufficiently elastic material to accommodate the passage of obstructions through the picking zone while maintaining compression against plants therein with the plants being held in optimum substantially upright picking position by said ribs on the belt.

4. A plant compressing apparatus, for a mechanical cotton picker and the like adapted for earth traversing movement along rows of plants and having a housing providing an elongated passage therethrough defining a picking zone to receive such rows of plants and including a plurality of power driven picking spindles having extended ends traveled through the picking zone at a velocity substantially equal to the earth traversing velocity of the picker and in a direction opposite to the direction of such picker movement, comprising an endless resiliently flexible plant compressing belt mounted in the housing for circuitous movement and having an inner compressing run disposed adjacent to said picking zone of the passage in opposed relation to said spindles for movement through said zone at substantially the same linear velocity and in the same direction as the spindles, said belt having a plurality of integral longitudinally circumscribing ribs defining therebetween a plurality of spindle receiving channels with the ends of the spindles disposed between the ribs during traversal of the picking zone and coacting with the ribs to wrap plant fibers thereabout.

References Cited

UNITED STATES PATENTS

| 853,916 | 5/1907 | Campbell | 56—43 |
| 1,163,729 | 12/1915 | Whitaker | 171—61 |
| 1,910,307 | 5/1933 | Rust | 56—43 |
| 2,540,655 | 2/1951 | Collins | 171—61 X |
| 2,699,638 | 1/1955 | Rust | 56—50 |
| 2,961,819 | 11/1960 | Edwards | 56—30 |
| 2,988,863 | 6/1961 | Edwards | 56—30 |
| 3,039,258 | 6/1962 | Cafaro | 56—49 |
| 3,217,475 | 11/1965 | Jennings | 56—29 |

ABRAHAM G. STONE, *Primary Examiner.*

RUSSELL R. KINSEY, *Examiner.*